Patented June 17, 1930

1,764,544

UNITED STATES PATENT OFFICE

HURLBUT L. BAUMGARDNER, OF CHICAGO, ILLINOIS

COATING FOR SURFACING PERMANENT MOLDS

No Drawing.   Application filed January 11, 1926. Serial No. 80,637.

This invention relates to a coating for surfacing permanent molds and the mold produced thereby, preferably of metal, for the purpose of preventing the characteristic chilling effect due to contact of the molten metal against the metal surface of the mold which results in the sudden absorption of heat from the molten metal due to the thermal conductivity of the metal mold.

In accordance with the present invention the mold, preferably of metal, is surfaced with a thin film or coating of a composition of a highly refractory character which, at the same time, possesses insulating properties in a very high degree, so that a thin surface film, insufficient in thickness to appreciably distort the mold, will at the same time serve to prevent the rapid absorption of heat and consequent chilling of the casting.

I have found that such a coating may be obtained by the use of a mixture including diatomaceous (infusorial) earth, which is a very fine earthy material consisting of minute silicious skeletons of diatoms. A product composed of this material is sold on the market under the name of Celite which consists of such diatomaceous earth subjected to heat preferably in the presence of a small quantity of sodium chloride in substantial accordance with the method set forth in Letters Patent of the United States, No. 1,502,547, issued July 22, 1924. The formula for Celite is substantially as follows:

.92 percent $SiO_2$ with traces of silicate of aluminum and iron. The heat serves to burn out the combustible impurities present in the natural earth and to cause an expansion in bulk of the material so that, as sold on the market, it is a very fine powder of extremely smooth texture and reduced substantially to a colloidal state of sub-division.

In practicing the present invention, I employ diatomaceous earth, preferably modified by heat in the presence of sodium chloride, and add to such material a substantially equal quantity of silicate of soda (liquid glass) which acts as an adhesive binder, and to this mixture I add water to the extent necessary to permit the mixture to be sprayed upon the surface of the metal mold by the use of an atomizer in the nature of an air brush. This treatment serves to coat the surface of the metal mold with an exceedingly thin film of material which is probably not greater in any case than between one thousandth to one five thousandth of an inch, which extreme thinness prevents the surface coating from appreciably modifying or altering the contour of the mold. After application in the manner stated, the water will quickly evaporate, and the liquid glass, serving as an adherent binder, will cause the surface film to permanently adhere to the mold.

The liquid glass is in itself a highly refractory material so that in the mixture it will maintain its binding and adhesive properties even when subjected to the heat of the molten metal poured into the mold, so that the mold may be repeatedly used without resurfacing. The diatomaceous earth product possesses thermal insulating properties of such marked character that when the metal is poured into the mold, it will cool gradually rather than suddenly, with the result that no chilling will be occasioned, and the texture of the casting will retain its toughness to such an extent that annealing will not be necessary. The fusing point of the mixture of the diatomaceous product and the liquid glass is substantially above the pouring temperature of gray iron, so that the film coating will not suffer any deleterious effects from repeated usage, with the result that the mold may be said to possess a relatively permanent coating which favorably modifies the character of the mold and enables permanent molds to be used for many purposes where such use was heretofore precluded by reason of the chilling effect produced on the castings.

I believe that the beneficial action above described is due to the finely comminuted state of the particles of the diatomaceous earth product which are in a colloidal state of sub-division, so that the surface division of the individual particles is enormously enhanced with a consequent reduction in the thermal conductivity to such an extent that a film of an inappreciable thickness will serve to retard the transmission of heat to the degree required to prevent chilling.

Although the method above described is peculiarly fitted to the surfacing of metal molds, it may also be beneficially employed in the surfacing of molds of other substances; or, if desired, the entire mold may be formed of materials including diatomaceous earth as a constituent, and the surface in such cases may be glazed or secured in some other manner than by the spraying on of a surface film.

It is also feasible to employ a mixture of materials including diatomaceous earth, or a product thereof, as an ingredient, for the purpose of packing castings after they come from the mold for the purpose of insulating them against the rapid dissipation of heat, thereby allowing the castings to become annealed without the necessity of reheating the castings or subjecting them to a special annealing process.

I claim:

1. A coating for metal molds consisting of a mixture of diatomaceous earth and a refractory binder as its principal ingredients.

2. A coating for metal molds consisting of diatomaceous earth and silicate of soda as its principal ingredients.

3. A coating for metal molds consisting of diatomaceous earth and silicate of soda together with water in an amount sufficient to constitute a spraying mixture.

4. A coating for metal molds consisting of diatomaceous earth and silicate of soda in substantially equal quantities together with water in an amount sufficient to constitute a spraying mixture.

HURLBUT L. BAUMGARDNER.